US012418108B2

(12) United States Patent
He et al.

(10) Patent No.: US 12,418,108 B2
(45) Date of Patent: Sep. 16, 2025

(54) BASE STATION ANTENNA AND BASE STATION

(71) Applicant: Huawei Technologies Co., Ltd., Shenzhen (CN)

(72) Inventors: Xin He, Dongguan (CN); Tingwei Xu, Dongguan (CN); Yuxi Liu, Dongguan (CN); Guoqing Xie, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 147 days.

(21) Appl. No.: 18/324,599

(22) Filed: May 26, 2023

(65) Prior Publication Data

US 2023/0299477 A1 Sep. 21, 2023

Related U.S. Application Data

(63) Continuation of application No. PCT/CN2020/132917, filed on Nov. 30, 2020.

(51) Int. Cl.

*H01Q 1/24* (2006.01)
*H01Q 1/12* (2006.01)
*H01Q 1/50* (2006.01)
*H01Q 3/30* (2006.01)

(52) U.S. Cl.

CPC ............. *H01Q 3/30* (2013.01); *H01Q 1/1228* (2013.01); *H01Q 1/246* (2013.01); *H01Q 1/50* (2013.01)

(58) Field of Classification Search

CPC ........ H01Q 1/1228; H01Q 1/246; H01Q 1/50; H01Q 21/065; H01Q 21/24

See application file for complete search history.

(56) References Cited

U.S. PATENT DOCUMENTS 6,091,365 A * 7/2000 Derneryd ................. H01Q 5/42
343/700 MS
11,075,467 B2 * 7/2021 Luo ........................ H01Q 21/30
2020/0328511 A1 10/2020 Zimmerman (Continued)

FOREIGN PATENT DOCUMENTS

| | | |
|---|---|---|
| CN | 202217794 U | 5/2012 |
| CN | 111682321 A | 9/2020 |
| WO | 2018049692 A1 | 3/2018 |

OTHER PUBLICATIONS

Naobumi Michishita et al: "Achievement of inverse frequency-dependent phase shift by using composite right/left-handed phase shifter", Antennas and Propagation (ISAP), 2012 International Symposium On. IEEE. Oct. 29, 2012 (Oct. 29, 2012) , pp. 1510-1513, XP032292741.

(Continued)

*Primary Examiner* — Awat M Salih
(74) *Attorney, Agent, or Firm* — Slater Matsil, LLP

(57) ABSTRACT

A base station antenna includes a plurality of antenna arrays and a phase dispersion circuit. The plurality of antenna arrays include a plurality of radiating elements, and the plurality of radiating elements include a first radiating element and a second radiating element that have a horizontal spacing. The phase dispersion circuit is configured to adjust a phase slope of an electromagnetic signal of the first radiating element in an operating frequency band and/or a phase slope of an electromagnetic signal of the second radiating element in the operating frequency band.

20 Claims, 7 Drawing Sheets

(56) References Cited

U.S. PATENT DOCUMENTS

| | | | | |
|---|---|---|---|---|
| 2021/0257720 A1* | 8/2021 | Wan | H01Q 21/26 | |
| 2023/0170630 A1* | 6/2023 | Du | H01Q 5/42 | 343/702 |
| 2024/0030591 A1* | 1/2024 | Liu | H01Q 1/246 | |

OTHER PUBLICATIONS

Y. Aizu, N. Michishita, Y. Yamada and K. Cho, "Non-linear phase shifter using composite right/left-handed transmission line on dielectric substrate," 2013 International Workshop on Antenna Technology (iWAT), Karlsruhe, Germany, Mar. 4-6, 2013, pp. 291-294, doi: 10.1109/IWAT.2013.6518350.

* cited by examiner (a)

(b)

BASE STATION ANTENNA AND BASE STATION

CROSS-REFERENCE TO RELATED APPLICATIONS

This application is a continuation of International Application No. PCT/CN2020/132917, filed on Nov. 30, 2020, the disclosure of which is hereby incorporated by reference in its entirety.

TECHNICAL FIELD

This application relates to the field of communication technologies, and in particular, to a base station antenna and a base station.

BACKGROUND

With popularization of a multiple-input multiple-output (MIMO) technology and a multi-frequency multi-mode base station antenna, a quantity of antenna arrays in a base station antenna is increasing, but a width of the base station antenna in a horizontal direction cannot be increased unlimitedly. As a result, antenna array arrangement in the horizontal direction is increasingly dense.

At present, the antenna array is generally fastened on a bottom plate and is parallel to the bottom plate. A width of the bottom plate is generally limited. With the limited width of the bottom plate, some antenna arrays seriously deviate from a central axis of the bottom plate, which causes a deterioration in a horizontal plane directivity pattern overlap ratio of beams (an overlap ratio of beams for short below) generated by a same antenna array operating on different frequencies. Consequently, performance of the base station antenna is affected.

SUMMARY

Embodiments of this application provide a base station antenna and a base station, to improve an overlap ratio of beams generated by a same antenna array that operates on different frequencies.

To achieve the foregoing objective, this application provides the following technical solutions.

According to a first aspect, a base station antenna is provided. The base station antenna includes a plurality of antenna arrays and a phase dispersion circuit. The plurality of antenna arrays include a plurality of radiating elements, and the plurality of radiating elements include a first radiating element and a second radiating element that have a horizontal spacing. The phase dispersion circuit is configured to adjust a phase slope of an electromagnetic signal of the first radiating element in an operating frequency band and/or a phase slope of an electromagnetic signal of the second radiating element in the operating frequency band, and the phase slope of the electromagnetic signal of the first radiating element in the operating frequency band is different from the phase slope of the electromagnetic signal of the second radiating element in the operating frequency band. The first radiating element and the second radiating element operate in the same operating frequency band.

According to the base station antenna provided in the first aspect, the phase dispersion circuit is used to feed the first radiating element and the second radiating element that have the horizontal spacing, to adjust the phase slope of the electromagnetic signal of the first radiating element in the operating frequency band and the phase slope of the electromagnetic signal of the second radiating element in the operating frequency band, so that the phase slope of the electromagnetic signal of the first radiating element is different from the phase slope of the electromagnetic signal of the second radiating element, and therefore, combined beam pointings of the first radiating element and the second radiating element at different frequencies are adjusted, and an overlap ratio of beams generated by a same antenna array operating at the different frequencies is further improved.

In a possible implementation, the base station antenna further includes a feeding network. An input end of the phase dispersion circuit is connected to an output end of the feeding network; and a first output end of the phase dispersion circuit is connected to an input end of the first radiating element, and a second output end of the phase dispersion circuit is connected to an input end of the second radiating element. The feeding network is used to provide radio frequency energy for the phase dispersion circuit, to ensure that the base station antenna can work normally.

In a possible implementation, the base station antenna further includes a third radiating element. The third radiating element also operates in the operating frequency band. A third output end of the phase dispersion circuit is connected to an input end of the third radiating element, where the phase dispersion circuit is further configured to adjust a phase slope of an electromagnetic signal of the third radiating element. The phase dispersion circuit may be connected to more (three or more) radiating elements. In this case, the phase dispersion circuit may selectively adjust phase slopes of electromagnetic signals of the radiating elements. As long as phase slopes of electromagnetic signals of radiating elements with a horizontal spacing are different, combined beam pointings of the radiating elements with the horizontal spacing at different frequencies may be adjusted, and an overlap ratio of beams generated by a same antenna array operating at the different frequencies is further improved.

In a possible implementation, the horizontal spacing between the first radiating element and the second radiating element is 0.25 times to 1 time a wavelength corresponding to a center frequency in the operating frequency band of the antenna array. When the horizontal spacing between the first radiating element and the second radiating element is within the range, a beam pointing may be better adjusted with slight impact on an antenna gain.

In a possible implementation, a first combined beam and a second combined beam have different horizontal pointings. The first combined beam is a beam obtained through combination by the first radiating element and the second radiating element when an operating frequency of the antenna array is less than a first frequency of the antenna array; and the second combined beam is a beam obtained through combination by the first radiating element and the second radiating element when the operating frequency of the antenna array is greater than the first frequency of the antenna array. The first combined beam and the second combined beam have the different horizontal pointings, so that bidirectional adjustment can be implemented on the overlap ratio of the beams generated by the same antenna array operating at the different frequencies.

In a possible implementation, the phase dispersion circuit includes the following device: a composite right/left-handed transmission line or a 180-degree bridge. In this possible implementation, the composite right/left-handed transmission line or the 180-degree bridge may be used to adjust the phase slope of the electromagnetic signal of the first radiating element in the operating frequency band and/or the phase slope of the electromagnetic signal of the second radiating element in the operating frequency band.

In a possible implementation, the plurality of radiating elements belong to a same antenna array. The phase slope of the electromagnetic signal of the first radiating element in the operating frequency band and the phase slope of the electromagnetic signal of the second radiating element in the operating frequency band are adjusted, so that the phase slope of the electromagnetic signal of the first radiating element is different from the phase slope of the electromagnetic signal of the second radiating element, and therefore, the combined beam pointings of the first radiating element and the second radiating element at the different frequencies are adjusted, and the overlap ratio of the beams generated by the same antenna array operating at the different frequencies is further improved.

In a possible implementation, the electromagnetic signal includes a transmit signal or a receive signal. This application is applicable to beam directivity pattern adjustment performed by a base station to radiate outwards, and is also applicable to beam directivity pattern adjustment performed when the base station is used for receiving.

According to a second aspect, a base station is provided. The base station includes the base station antenna described in the first aspect. The base station provided in the second aspect includes the base station antenna described in the first aspect. The base station antenna includes a plurality of antenna arrays and a phase dispersion circuit. The phase dispersion circuit is used to feed a first radiating element and a second radiating element that are in the plurality of antenna arrays and that have a horizontal spacing, to adjust a phase slope of an electromagnetic signal of the first radiating element in an operating frequency band and a phase slope of an electromagnetic signal of the second radiating element in the operating frequency band, so that the phase slope of the electromagnetic signal of the first radiating element is different from the phase slope of the electromagnetic signal of the second radiating element, and therefore, combined beam pointings of the first radiating element and the second radiating element at different frequencies are adjusted, and an overlap ratio of beams generated by a same antenna array operating at the different frequencies is further improved.

DETAILED DESCRIPTION OF ILLUSTRATIVE EMBODIMENTS

The following describes the technical solutions in embodiments of this application with reference to accompanying drawings in embodiments of this application. In descriptions of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Figure 1:
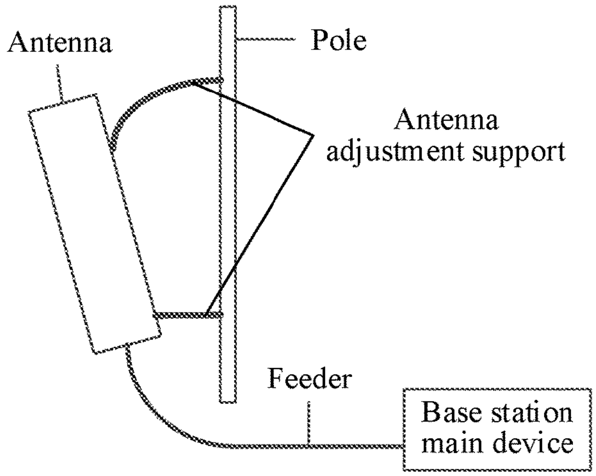
FIG. 1 is a schematic diagram of a base station antenna feeder system.

A base station antenna (an antenna for short below) provided in embodiments of this application may be used in a base station antenna feeder system shown in FIG. 1. With reference to FIG. 1, the base station antenna feeder system includes an antenna, a feeder, a base station main device, a pole, an antenna adjustment support, and the like. The antenna is configured to convert a radio frequency signal of the base station into an electromagnetic wave and radiate the electromagnetic wave in a specific manner and direction, or convert a received electromagnetic wave into a radio frequency signal and feed the radio frequency signal back to the base station through a specific channel, and the antenna includes a feeding network configured to provide radio frequency energy for a radiating element in the antenna. The feeder is configured to connect the antenna and the base station main device, and is further configured to connect the radiating element and the feeding network (where this is not shown in the figure). The base station main device is configured to process baseband and radio frequency signals, provide a channel capacity and a system capacity, and implement uplink and downlink communication functions. The pole is configured to support the antenna. The antenna adjustment support is configured to fix the antenna and adjust a beam downtilting angle of the antenna to adjust a coverage area of the beam.

Figure 2:
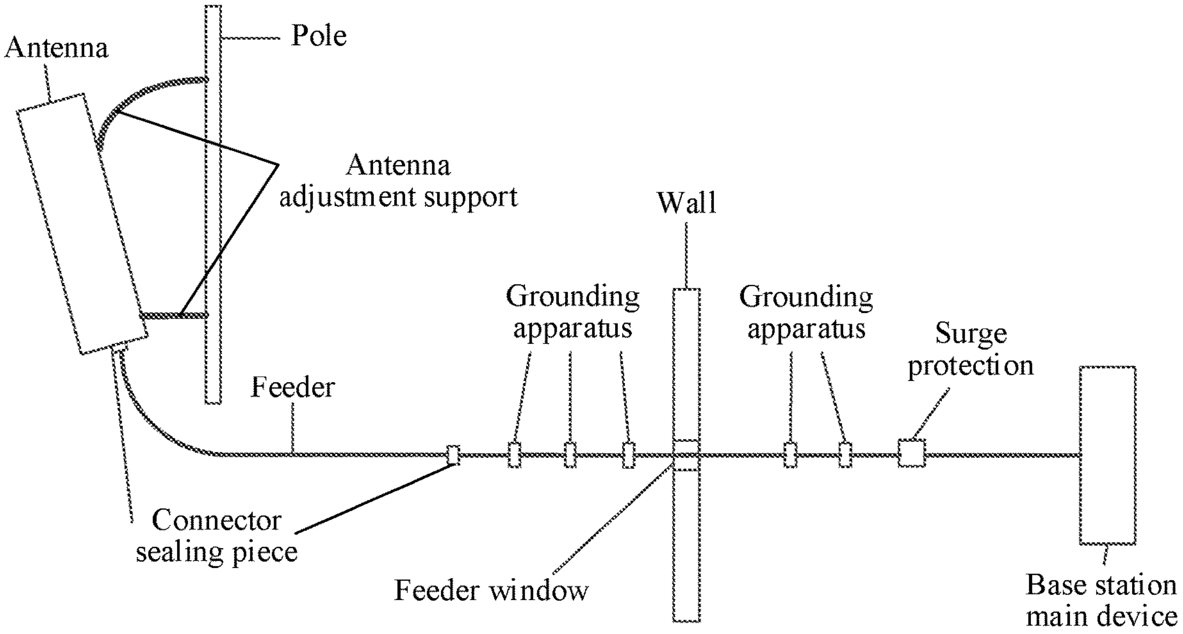
FIG. 2 is a schematic diagram of another base station antenna feeder system.

The antenna provided in embodiments of this application may be further used in a base station antenna feeder system shown in FIG. 2. With reference to FIG. 2, the base station antenna feeder system includes an antenna adjustment support, a pole, an antenna, a connector sealing piece, a grounding apparatus, surge protection, a feeder, a feeder window, and a base station main device. For functions of the antenna adjustment support, the pole, the antenna, and the base station main device, refer to the foregoing descriptions. The connector sealing piece seals an interface between the antenna and the feeder to prevent the antenna from being damaged by electric leakage. The grounding apparatus has safety and electric static protection functions. The surge protection has safety and surge protection functions. The feeder window is used for sealing installation of the feeder through the wall.

Figure 3:
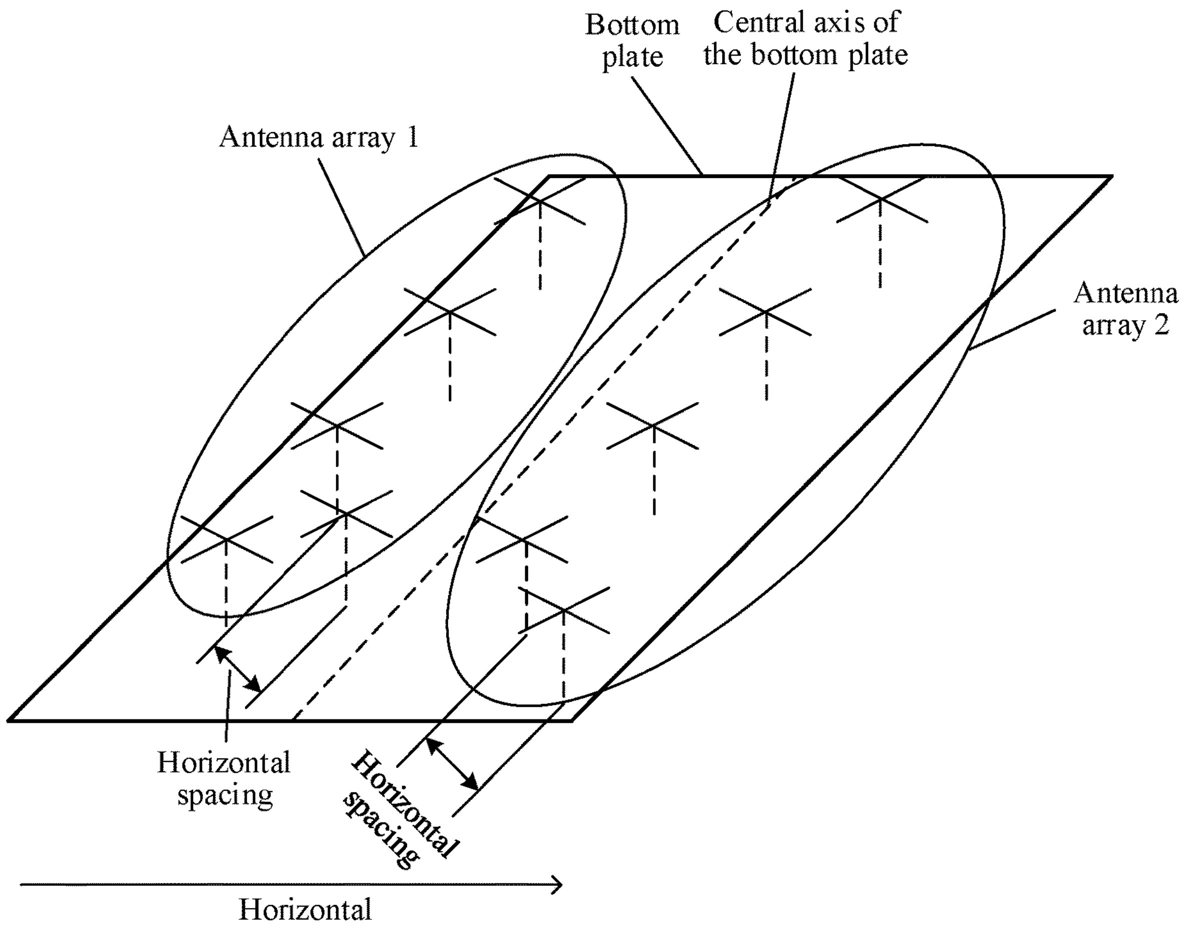
FIG. 3 is a schematic diagram of a structure of an antenna array.

The antenna provided in embodiments of this application may include a plurality of antenna arrays. With reference to FIG. 3, an antenna array may be fastened on a bottom plate and parallel to the bottom plate. Each antenna array may include a plurality of radiating elements, and the radiating element may be an antenna element. An antenna array whose horizontal spacing between radiating elements (where the horizontal spacing is a spacing between horizontally arranged radiating elements, and for details, reference may be made to FIG. 3) is not all 0 may be referred to as a non-linear array. For example, both an antenna array 1 and an antenna array 2 in FIG. 3 are non-linear arrays. A form of a radiating element having a horizontal spacing with another radiating element may be the same as or different from a form of the another radiating element, provided that the radiating element and the another radiating element can operate in a same frequency band. For example, a form of the radiating element may be a half-wave dipole, a slot unit, a microstrip patch, or the like. An antenna array operating at a specific frequency may generate a beam in a specific direction. Because the antenna bottom plate is generally made of a metal material, the beam may be reflected and converged to a needed radiation direction, to improve an antenna gain, and further improve beam performance.

Figure 4:
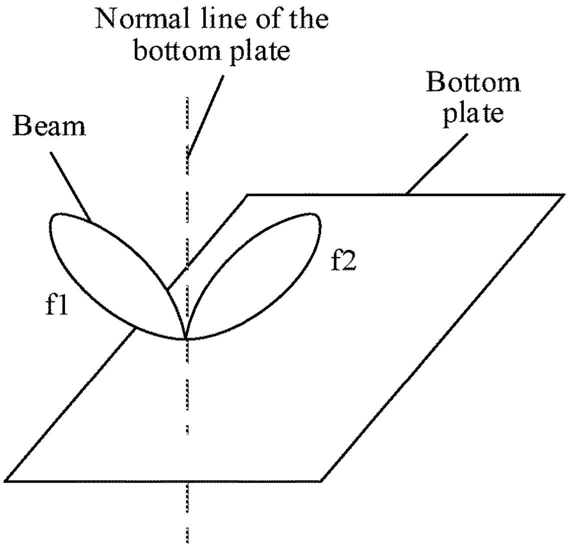
FIG. 4 is a schematic diagram of a beam pointing.

For an antenna array (assuming that the antenna array is an antenna array a), when the antenna array a seriously deviates from a central axis of a bottom plate, because a surrounding array environment is asymmetric, horizontal plane directivity pattern (where the horizontal plane refers to a tangent plane used by a beam to implement horizontal network coverage, and may have a specified vertical down-tilting angle as required) pointings of beams (HBP) (where for ease of description, the pointings are briefly described as beam pointings in the following) of the antenna array a at different frequencies in an operating frequency band deviate from a normal line direction of the bottom plate to different degrees. Deviation directions may even be inconsistent. For example, with reference to FIG. 4, a beam pointing of the antenna array a at a frequency near a lower side frequency f1 of an operating frequency band [f1, f2] is located to the left of a normal line of the bottom plate, and a beam pointing of the antenna array a at a frequency near an upper side frequency f2 is located to the right of the normal line of the bottom plate. This brings problems such as a poor beam overlap ratio, poor beam pointing consistency, and a severe beam squint (squint, which is a degree to which the beam pointing deviates from the normal line direction of the bottom plate), and further causes poor beam coverage consistency and poor antenna performance.

Figure 5:
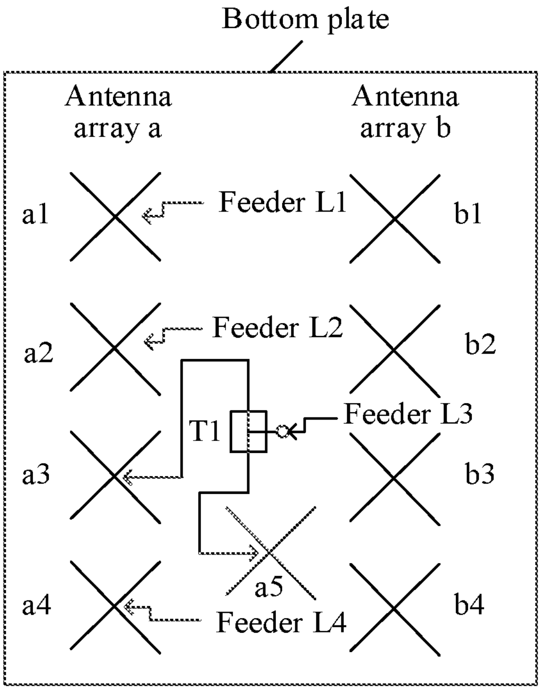
FIG. 5 is a schematic diagram of a structure of another antenna array.

Currently, a non-linear array usually uses a power splitter or a phase shifter to feed a radiating element in the non-linear array. A beam pointing and a beam squint degree in an operating frequency band of an antenna array are improved by adjusting a phase difference between radiating elements that are horizontally arranged, namely, radiating elements that have a horizontal spacing. For example, with reference to FIG. 5, an antenna array a includes radiating elements a1 to a5, and there is a horizontal spacing between the radiating element a5 and other radiating elements a1 to a4. Radiating elements a1, a2, and a4 are fed by using feeders L1, L2, and L4 at output ends of a feeding network, and radiating elements a3 and a5 are fed by using a conventional one-to-two (that is, one input end and two output ends) power splitter (denoted as T1). The beam pointing and the beam squint degree in the operating frequency band of the antenna array are improved by adjusting, by using the one-to-two power splitter, a phase difference between radiating elements having the horizontal spacing. There may be one or more other antenna arrays (for example, an antenna array b in FIG. 5) beside the antenna array a. After the power splitter or the phase shifter adjusts the phase difference, if a phase of an electromagnetic signal of a radiating element (assuming that the radiating element is the radiating element a3 in the antenna array a in FIG. 5) at a frequency lags behind a phase of an electromagnetic signal of another radiating element (assuming that the another radiating element is the radiating element a5 in the antenna array a in FIG. 5), the phase of the electromagnetic signal of the radiating element a3 lags behind the phase of the electromagnetic signal of the radiating element a5 in an entire operating frequency band. Because a direction of a combined beam of the radiating element a3 and the radiating element a5 is biased toward a deployment direction of a lagging radiating element (namely, the radiating element a3), when the pointing of the combined beam of the radiating element a3 and the radiating element a5 is adjusted, the direction can be adjusted only toward a side of the deployment direction of the radiating element a3. In other words, in the operating frequency band, in an existing method, a beam of an antenna array can be adjusted only in one direction, and therefore, a beam pointing and a beam squint degree of the antenna array in the operating frequency band can be improved only in one direction. For example, beam pointings can only be improved to the left or to the right in a unified manner. Beam pointings in the operating frequency band are still scattered to some extent, and problems such as a poor beam overlap ratio, poor beam pointing consistency, and a severe beam squint still exist. The electromagnetic signal is a signal transmitted or received by an antenna, and includes a received signal or a transmitted signal. For example, when a radiating element radiates a signal to the outside, the radiating element converts a radio frequency signal into an electromagnetic wave signal and radiates the electromagnetic wave signal to the outside; and when the radiating element receives a signal, the radiating element converts an electromagnetic wave signal in space into a radio frequency signal. The electromagnetic signal may be the radio frequency signal or the electromagnetic wave signal.

For example, originally for the antenna array a, a beam pointing of the antenna array a at a frequency near a lower side frequency f1 of an operating frequency band [f1, f2] locates 60° to the left of a normal line of a bottom plate, and a beam pointing of the antenna array a at a frequency near an upper side frequency f2 locates 30° to the right of the normal line of the bottom plate. It can be seen that the beam pointing of the antenna array a at the frequency near the lower side frequency f1 greatly tilts to the left. To adjust the beam pointing of the antenna array a at the frequency near the lower side frequency f1 20° to the right, the beam pointing of the antenna array a at the frequency near the upper side frequency f2 also needs to be adjusted rightwards. An angle adjusted may be less than 20°, or may be greater than 20°, for example, 30°. In this case, after the adjustment, the beam pointing of the antenna array a at the frequency near the lower side frequency f1 locates 40° to the left of the normal line of the bottom plate, and the beam pointing of the antenna array a at the frequency near the upper side frequency f2 locates 70° to the right of the normal line of the bottom plate. The beam pointings in the operating frequency band are still scattered to some extent, and may even be more dispersed than originally, resulting in problems such as the poor beam overlap ratio, the poor beam pointing consistency, and the severe beam squint.

To resolve the foregoing problems, this application provides an antenna. A power splitter or a phase shifter in an existing antenna is replaced with a phase dispersion circuit, so that a beam pointing of an antenna array can be bidirectionally adjusted in an operating frequency band, to improve a beam overlap ratio, beam pointing consistency, and a beam squint. The antenna may be widely used in a scenario in which a high requirement is imposed on coverage consistency of beams of a same antenna array at different frequencies and beams of different antenna arrays at a same frequency, for example, a MIMO scenario.

The following describes an implementation of this application in detail.

This application provides an antenna, including a plurality of antenna arrays and a phase dispersion circuit.

The plurality of antenna arrays include a plurality of radiating elements. The plurality of radiating elements include a first radiating element and a second radiating element, there is a horizontal spacing between the first radiating element and the second radiating element, and the first radiating element and the second radiating element operate in a same operating frequency band.

The phase dispersion circuit is configured to adjust a phase slope of an electromagnetic signal of the first radiating element in the operating frequency band and/or a phase slope of an electromagnetic signal of the second radiating element in the operating frequency band, and the phase slope of the electromagnetic signal of the first radiating element in the operating frequency band is different from the phase slope of the electromagnetic signal of the second radiating element in the operating frequency band.

The plurality of radiating elements may be located in a same antenna array, or may be located in different antenna arrays. This is not limited in this application. In the following part of this application, an example in which the plurality of radiating elements are located in the same antenna array is used to describe the antenna array provided in this application. When the plurality of radiating elements are located in the different antenna arrays, implementation principles are similar to that in this application, and reference may be made to this application for understanding. Details are not described again.

Figure 6:
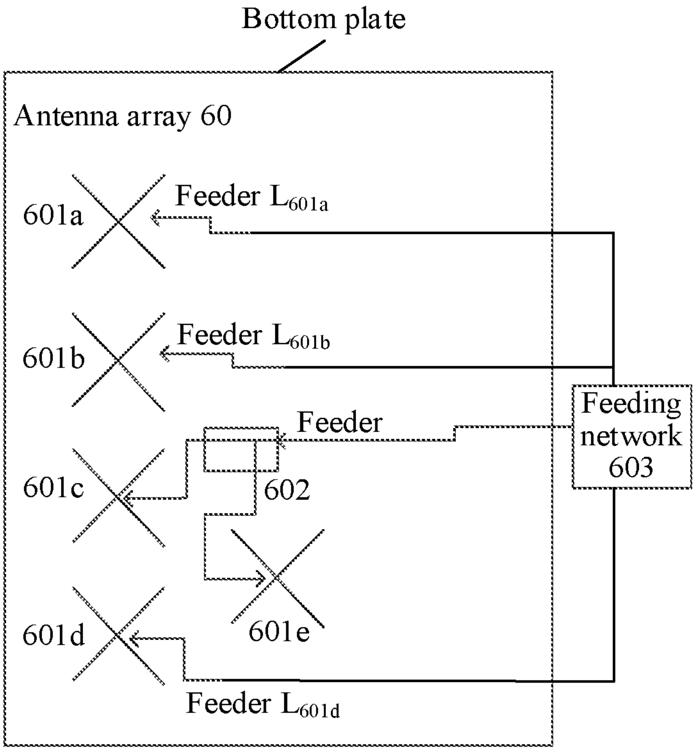
FIG. 6 is a schematic diagram of a structure of an antenna array according to an embodiment of this application.

With reference to FIG. 6, an antenna array 60 located in an antenna according to this application includes the following parts.

A plurality of radiating elements (for example, there are five radiating elements in FIG. 6, and the five radiating elements are respectively marked as 601*a*, 601*b*, 601*c*, 601*d*, and 601*e*) are included. The plurality of radiating elements include a first radiating element (for example, 601*c*) and a second radiating element (for example, 601*e*), and there is a horizontal spacing between the first radiating element and the second radiating element.

A phase dispersion circuit (which is marked as 602 in FIG. 6) is included. The phase dispersion circuit is configured to adjust a phase slope of an electromagnetic signal of the first radiating element in an operating frequency band and/or a phase slope of an electromagnetic signal of the second radiating element in the operating frequency band, and the phase slope of the electromagnetic signal of the first radiating element in the operating frequency band is different from the phase slope of the electromagnetic signal of the second radiating element in the operating frequency band.

Because there is the horizontal spacing between the first radiating element and the second radiating element, it may be learned that the antenna array 60 is a non-linear array. Relative positions of the first radiating element and the second radiating element may be flexibly selected based on a requirement. A working frequency of the antenna array 60 is within the operating frequency band of the first radiating element and the second radiating element.

Optionally, the horizontal spacing between the first radiating element and the second radiating element is 0.25 times to 1 time a wavelength corresponding to a center frequency in the operating frequency band of the antenna array 60. When the horizontal spacing between the first radiating element and the second radiating element is within the range, a beam pointing may be better adjusted with slight impact on an antenna gain.

A phase slope is a slope of a phase curve of a radiating element, and the phase curve represents a phase change of an electromagnetic signal of the radiating element in an operating frequency band. A larger difference between phase slopes of electromagnetic signals of the two radiating elements indicates a larger phase dispersion of the two radiating elements. Adjusting a phase slope of an electromagnetic signal of a single radiating element causes a phase difference between electromagnetic signals of the radiating element and another radiating element to change, and the phase difference change affects a pointing of a combined beam of the radiating element and the another radiating element. A reason why the phase difference change affects the pointing of the combined beam of the two radiating elements is that when phase differences between the electromagnetic signals of the two radiating elements are different, effects of interference superposition of the electromagnetic signals are different. Therefore, the pointing of the combined beam of the two radiating elements may be changed by changing the phase difference between the electromagnetic signals of the two radiating elements. A direction of a beam of the antenna array 60 may be changed by changing the pointing of the combined beam of the two radiating elements.

Optionally, the phase dispersion circuit includes the following device: a composite right/left-handed transmission line or a 180-degree bridge. For related descriptions of the composite right/left-handed transmission line and the 180-degree bridge, refer to Embodiment 1 and Embodiment 2 in the following respectively. Details are not described herein.

Optionally, a first output end of the phase dispersion circuit is connected to an input end of the first radiating element, and a second output end of the phase dispersion circuit is connected to an input end of the second radiating element. FIG. 6 is drawn by using an example in which the antenna array 60 includes the five radiating elements. To distinguish different radiating elements, the five radiating elements are respectively denoted as radiating elements 601*a* to 601*e*. The first radiating element is 601*c*, the second radiating element is 601*e*, the first output end of the phase dispersion circuit is connected to the input end of 601*c*, and the second output end of the phase dispersion circuit is connected to the input end of 601*e*.

Optionally, with reference to FIG. 6, the antenna array 60 further includes a feeding network 603, and an input end of the phase dispersion circuit is connected to an output end of the feeding network. The feeding network is configured to provide radio frequency energy for the phase dispersion circuit. The feeding network 603 may further be connected to input ends of the radiating element 601*a*, the radiating element 601*b*, and the radiating element 601*d* respectively through feeders L601*a*, L601*b*, and L601*d*, to provide radio frequency energy for the radiating elements.

Optionally, a first combined beam and a second combined beam have different horizontal pointings. The first combined beam is a beam obtained through combination by the first radiating element and the second radiating element when the operating frequency of the antenna array 60 is less than a first frequency of the antenna array 60; and the second combined beam is a beam obtained through combination by the first radiating element and the second radiating element when the operating frequency of the antenna array 60 is greater than the first frequency of the antenna array 60. The first frequency is a frequency in the operating frequency band. For example, the first frequency may be the center frequency in the operating frequency band. The first frequency may be selected according to a specific rule. By determining the first frequency, it can be ensured that a compensated beam pointing of the antenna array 60 at another frequency is closer to a beam pointing of the antenna array 60 at the first frequency. The beam pointing of the antenna array 60 at the first frequency may be any pointing, for example, may be a normal line direction of a bottom plate. In this case, when a beam pointing of the antenna array 60 is in a small range (for example, 3° to the left side and 3° to the right side) between a left side and a right side of the normal line of the bottom plate at a frequency, the frequency may be considered as the first frequency. For ease of description, the antenna array 60 provided in this application is described below by using an example in which the beam pointing of the antenna array at the first frequency is the normal line direction of the bottom plate. In this embodiment of this application, the phase slope of the electromagnetic signal of the first radiating element and/or the phase slope of the electromagnetic signal of the second radiating element may be adjusted by using the device in the phase dispersion circuit, so that the phase slope of the electromagnetic signal of the first radiating element and/or the phase slope of the electromagnetic signal of the second radiating element suddenly change/changes, so that phase curves of the first radiating element and the second radiating element intersect. Then, a length of a jumper (where a jumper is a transmission line between a radiating element and the phase dispersion circuit) of the first radiating element in the phase dispersion circuit and/or a length of a jumper of the second radiating element in the phase dispersion circuit are/is adjusted, so that the phase curves of the first radiating element and the second radiating element intersect at the first frequency. Alternatively, the phase slope of the electromagnetic signal of the first radiating element and/or the phase slope of the electromagnetic signal of the second radiating element may be adjusted by using the device in the phase dispersion circuit, so that phase curves of the first radiating element and the second radiating element are parallel. Then, a length of a jumper of the first radiating element in the phase dispersion circuit and/or a length of a jumper of the second radiating element in the phase dispersion circuit are/is adjusted, so that the phase slope of the electromagnetic signal of the first radiating element and the phase slope of the electromagnetic signal of the second radiating element suddenly change and the phase curves of the first radiating element and the second radiating element intersect at the first frequency. Finally, the phase curves of the first radiating element and the second radiating element intersect at the first frequency by adjusting the phase dispersion circuit, and therefore, the compensated beam pointing of the antenna array 60 at the another frequency is closer to the beam pointing of the antenna array 60 at the first frequency.

It can be learned from the foregoing that adjusting the phase slope of the radiating element in the operating frequency band affects a phase difference between the radiating element and another radiating element, and therefore affects a pointing of a combined beam of the radiating element and the another radiating element. It can be learned that, adjusting the phase slope of the first radiating element in the operating frequency band and/or the phase slope of the second radiating element in the operating frequency band by using the phase dispersion circuit affects the pointing of the combined beam of the first radiating element and the second radiating element and the beam pointing of the antenna array 60.

In a process of adjusting the phase slope of the first radiating element and/or the phase slope of the second radiating element, at a same operating frequency, a phase of an electromagnetic signal of the first radiating element may lead to a phase of an electromagnetic signal of the second radiating element, or a phase of an electromagnetic signal of the second radiating element may lead to a phase of an electromagnetic signal of the first radiating element. The direction of the combined beam of the first radiating element and the second radiating element is biased toward a deployment direction of a lagging radiating element. In this way, bidirectional adjustment of the combined beam can be implemented.

Figure 7:
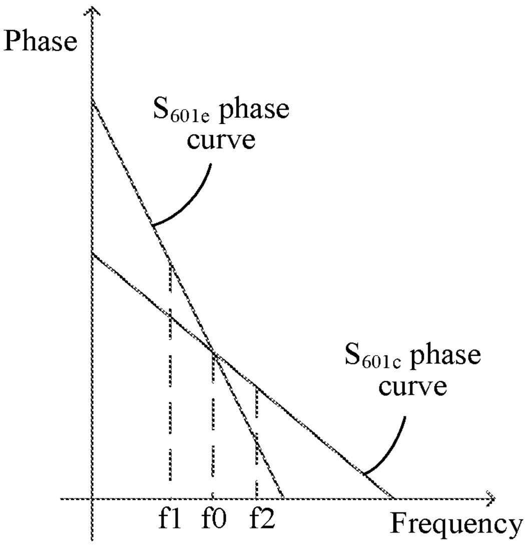
FIG. 7 is a schematic diagram of a phase curve of a radiating element according to an embodiment of this application.
Figure 8:
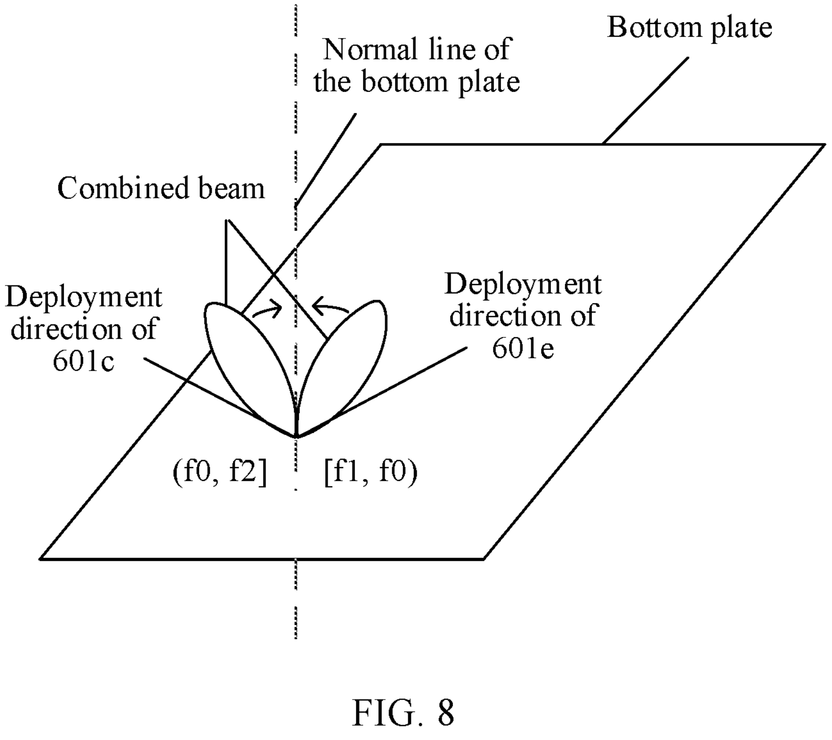
FIG. 8 is a schematic diagram of a beam pointing according to an embodiment of this application.

For example, based on the example shown in FIG. 6, an electromagnetic signal of 601*c* and an electromagnetic signal of 601*e* are S601*c* and S601*e* respectively. Phase slopes of phase curves of S601*c* and S601*e* are different. With reference to FIG. 7, the phase curves of S601*c* and S601*e* intersect at the first frequency (assuming that the first frequency is f0). In this case, it can be learned from FIG. 7 that, in an operating frequency band [f1, f2], because the phase slopes of S601*c* and S601*e* are different, for a frequency in [f1, f0), a phase of S601*e* leads to a phase of S601*c*, and a direction of a combined beam of 601*c* and 601*e* is biased toward a deployment direction of 601*c* and located between a normal line of a bottom plate and a deployment direction of 601*e* (where reference may be made to a right side in FIG. 8). In this way, a deflection direction of a beam of the antenna array 60 before adjustment may be compensated to the left. For a frequency in (f0, f2], a phase of S601*e* lags behind a phase of S601*c*. A direction of a combined beam of 601*c* and 601*e* is biased toward a deployment direction of 601*e* and located between a normal line of a bottom plate and a deployment direction of 601*c* (where reference may be made to a left side in FIG. 8). In this way, a deflection direction of a beam of the antenna array 60 before adjustment can be compensated to the right.

That is, by adjusting the direction of the combined beam of 601*c* and 601*e*, the direction of the beam of the entire antenna array 60 can be adjusted. For example, when the antenna array 60 works at f1, the direction of the beam of the antenna array 60 may be adjusted to be closer to the normal line of the bottom plate; and when the antenna array 60 works at f2, the direction of the beam of the antenna array 60 may be adjusted to be closer to the normal line of the bottom plate. Therefore, a beam overlap ratio and beam pointing consistency of the antenna array 60 at different frequencies can be improved, and a beam squint degree can be reduced.

For example, at a frequency near the frequency f1, an included angle between the beam pointing of the antenna array 60 and the normal line of the bottom plate before adjustment is +45° (where a positive sign indicates that a beam is located on a right side of the normal line of the bottom plate). In this case, the phase dispersion circuit feeds power to 601*c* and 601*e*, so that an included angle between the combined beam of 601*c* and 601*e* and the normal line of the bottom plate is +30°, thereby compensating the beam deflection of the antenna array 60 to the left, so that the beam pointing of the antenna array 60 is biased toward the normal line of the bottom plate. For example, an included angle between the beam of the antenna array 60 and the normal line of the bottom plate is +35°. Similarly, at a frequency near the frequency f2, an included angle between the beam pointing of the antenna array 60 and the normal line of the bottom plate before adjustment is −40° (where a negative sign indicates that a beam is located on a left side of the normal line of the bottom plate). In this case, the phase dispersion circuit feeds power to 601*c* and 601*e*, so that an included angle between the combined beam of 601*c* and 601*e* and the normal line of the bottom plate is −32°, thereby compensating the beam deflection of the antenna array 60 to the right, so that the beam pointing of the antenna array 60 is biased toward the normal line of the bottom plate. For example, an included angle between the beam of the antenna array 60 and the normal line of the bottom plate is −35°. That is, an included angle between the beam of the antenna array 60 in the operating frequency band and the normal line of the bottom plate is adjusted from [−40°, +45] to [−35°, +35], thereby implementing bidirectional adjustment of the beam pointing of the antenna array 60. Therefore, the beam overlap ratio and the beam pointing consistency of the antenna array 60 at the different frequencies can be improved, and the beam squint degree can be reduced. It should be noted that the foregoing adjusted angle of the included angle is merely an example for description, and specific adjustment needs to be performed based on an actual situation. This application is not limited to that an effect of adjustment is the same as that of the foregoing.

For a plurality of antenna arrays working at a same frequency, a working principle is similar to that of the foregoing technical solutions in the single antenna array scenario, and reference may be made to the foregoing technical solutions for understanding. Details are not described again. For example, if there are two antenna arrays, and operating frequency bands are both [f1, f2], directions of beams of the two antenna arrays may be adjusted to be closer to a normal line of a bottom plate at each frequency in the operating frequency band, so that a beam coverage overlap ratio and beam pointing consistency of the two antenna arrays are improved, and a beam squint degree is reduced. In a MIMO scenario, MIMO performance can be improved.

According to the antenna array 60 provided in this application, the phase dispersion circuit is used to adjust the phase slope of the electromagnetic signal of the first radiating element in the operating frequency band and/or the phase slope of the electromagnetic signal of the second radiating element in the operating frequency band, so that the direction of the combined beam of the first radiating element and the second radiating element can be adjusted. The beam deflection of the antenna array 60 can be bidirectionally compensated by adjusting the deflection direction of the combined beam, to improve the beam overlap ratio and the beam pointing consistency, reduce the beam squint degree, improve beam coverage consistency, and further improve antenna performance.

In the foregoing embodiment, the phase dispersion circuit has only two output ends, that is, only two channels of signals can be output. During actual implementation, the phase dispersion circuit may output more (for example, three or more) channels of signals. For example, when the phase dispersion circuit outputs three channels of signals, a third output end of the phase dispersion circuit is connected to an input end of a third radiating element, and the third radiating element belongs to the antenna array 60. In this case, the phase dispersion circuit may be further configured to adjust a phase slope of an electromagnetic signal of the third radiating element.

The third radiating element may have a horizontal spacing with the first radiating element, or may have a horizontal spacing with the second radiating element, or may have a horizontal spacing with both the first radiating element and the second radiating element. In this case, the phase dispersion circuit may selectively adjust phase slopes of electromagnetic signals of the radiating elements. As long as phase slopes of electromagnetic signals of radiating elements with a horizontal spacing are different, combined beam pointings of the radiating elements with the horizontal spacing at different frequencies may be adjusted, and an overlap ratio of beams generated by the antenna array 60 operating at the different frequencies is further improved.

Figure 9:
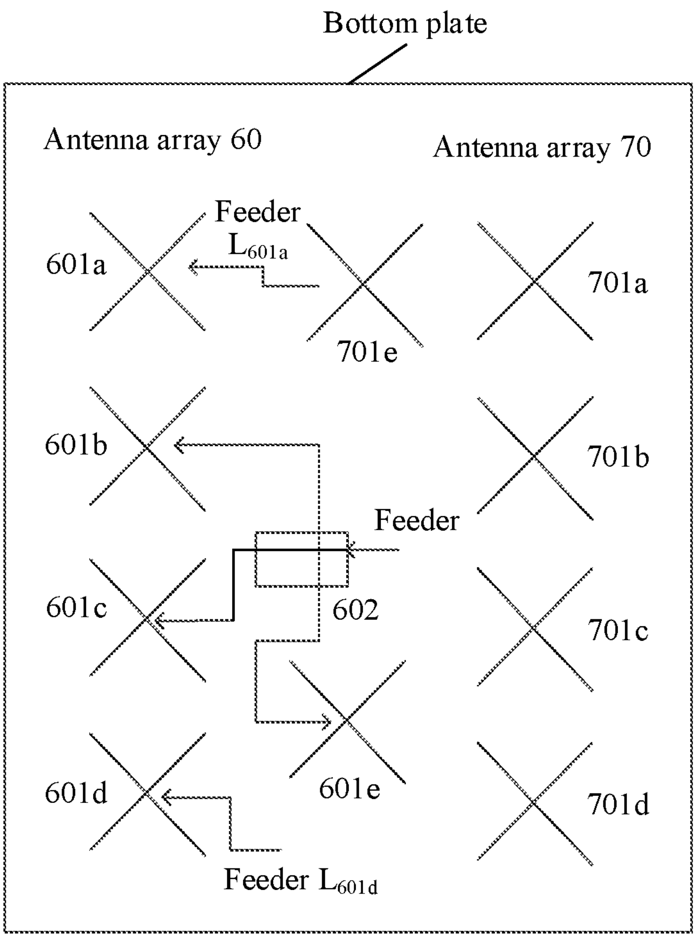
FIG. 9 is a schematic diagram of a structure of another antenna array according to an embodiment of this application.

For example, with reference to FIG. 9, three output ends of the phase dispersion circuit may be respectively connected to 601*b*, 601*c*, and 601*e*. The phase dispersion circuit may adjust phase slopes of one or more of electromagnetic signals of 601*b*, 601*c*, and 601*e* within an operating frequency band. It should be noted that, in addition to the antenna array 60, a bottom plate may further include one or more other antenna arrays, for example, an antenna array 70 in FIG. 9. The antenna array 70 includes radiating elements 701*a* to 701*e*. The antenna array 70 may be an existing antenna array, or may be an antenna array provided in this application. This is not limited.

Figure 10:
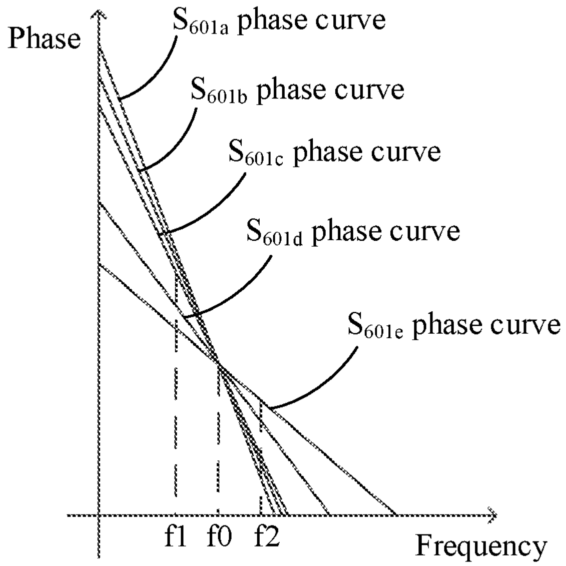
FIG. 10 is a schematic diagram of a phase curve of another radiating element according to an embodiment of this application.

It should be noted that, when the antenna array is designed, a phase difference between radiating elements needs to be adjusted, so that phases of radiating elements that are arranged vertically (that is, in a direction perpendicular to a horizontal direction) in the antenna array are equal at a frequency f0, to ensure an antenna gain. Therefore, optionally, in this application, based on a phase change of the first radiating element and the second radiating element, a length of a feeder at an output end of a feeding network connected to the phase dispersion circuit may be adjusted, or a length of a feeder of a radiating element other than the first radiating element and the second radiating element may be adjusted, so that the phases of the radiating elements that are arranged vertically in the antenna array are equal at the frequency f0. For example, based on the example shown in FIG. 6, a length of a feeder at an output end of the feeding network connected to the phase dispersion circuit is adjusted, or lengths of L601*a*, L601*b*, and L601*d* are adjusted to compensate for phases of the radiating element 601*a*, the radiating element 601*b*, and the radiating element 601*d* in the antenna array 60 at the first frequency, so that the phases of the radiating elements that are arranged vertically in the antenna array are equal at the frequency f0, for example, as shown in FIG. 10. S601*a*, S601*b*, and S601*d* in FIG. 10 are electromagnetic signals of the radiating element 601*a*, the radiating element 601*b*, and the radiating element 601*d* respectively.

Figure 11:
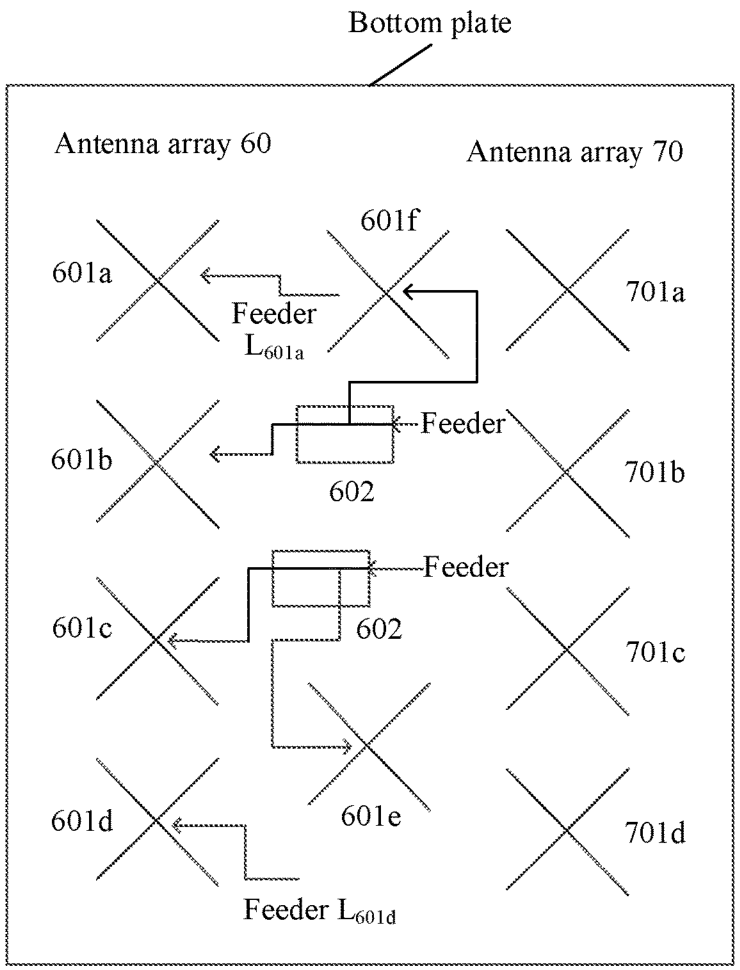
FIG. 11 is a schematic diagram of a structure of another antenna array according to an embodiment of this application.

In addition, the antenna array 60 provided in this application may include a plurality of phase dispersion circuits. Output ends of different phase dispersion circuits may be connected to a same radiating element, or may be connected to different radiating elements. This is not limited in this application. For example, with reference to FIG. 11, an output end of one phase dispersion circuit may be connected to the radiating element 601*c* and the radiating element 601*e*, and an output end of the other phase dispersion circuit may be connected to the radiating element 601*b* and a radiating element 601*f*. Phase slopes of electromagnetic signals of radiating elements are adjusted by the plurality of phase dispersion circuits, so that phase curves of the electromagnetic signals of the radiating elements intersect at a first frequency.

To make embodiments of this application clearer, the following describes the foregoing embodiments by using Embodiment 1 and Embodiment 2. A main difference between Embodiment 1 and Embodiment 2 lies in that a phase dispersion circuit in Embodiment 1 includes a composite right/left-handed transmission line with a short-circuit stub, and a phase dispersion circuit in Embodiment 2 includes a 180-degree bridge. The following separately describes Embodiment 1 and Embodiment 2.

Embodiment 1: A phase dispersion circuit includes a composite right/left-handed transmission line with a short-circuit stub (where the transmission line is referred to as a composite right/left-handed transmission line for short).

Figure 12:
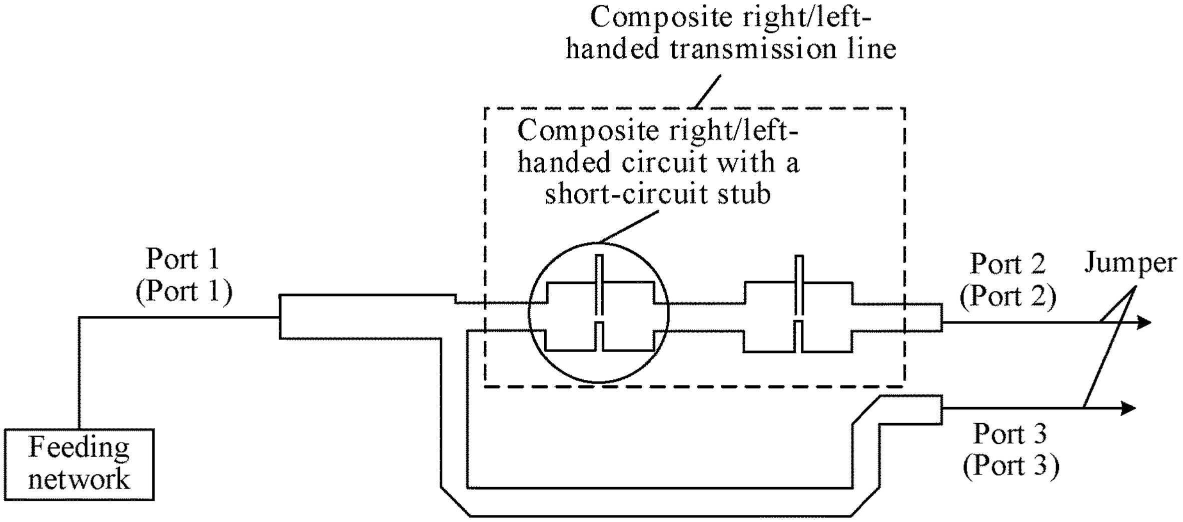
FIG. 12 is a schematic diagram of a structure of a phase dispersion circuit according to an embodiment of this application.

With reference to FIG. 12, the phase dispersion circuit may be implemented by using a microstrip circuit printed circuit board (PCB). The microstrip circuit PCB is a three-port network, and the phase dispersion circuit on the microstrip circuit PCB includes a composite right/left-handed transmission line with a short-circuit stub, a port 1, a port 2, a port 3, and a jumper. The port 2 may be connected to an input end of a first radiating element, and the port 3 may be connected to an input end of a second radiating element. The phase dispersion circuit includes the composite right/left-handed transmission line, and a quantity of composite right/left-handed circuits with the short-circuit stub on the composite right/left-handed transmission line is a quantity of levels of the composite right/left-handed transmission line. FIG. 12 is drawn by using the quantity of levels of the composite right/left-handed transmission line as 2. During actual implementation, the quantity of levels of the composite right/left-handed transmission line may be larger or smaller. This is not limited in this application.

The composite right/left-handed transmission line may cause a sudden change in a phase slope of S21 (where S21 is an electromagnetic signal from the port 1 to the port 2), and a phase slope obtained after the sudden change is larger. When a phase slope of an electromagnetic signal of the first radiating element and/or a phase slope of an electromagnetic signal of the second radiating element are/is adjusted, phase curves of the first radiating element and the second radiating element may be first adjusted by using the phase dispersion circuit to intersect, and then a length of a jumper of the port 2 and/or a length of a jumper of the port 3 are adjusted, so that the phase curves of the first radiating element and the second radiating element intersect at a first frequency.

Figure 13:
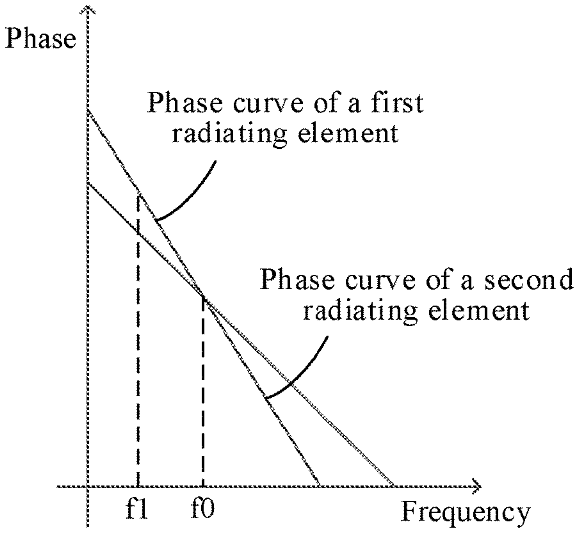
FIG. 13 is schematic diagrams of phase curves of other radiating elements according to embodiments of this application.
Figure 13:
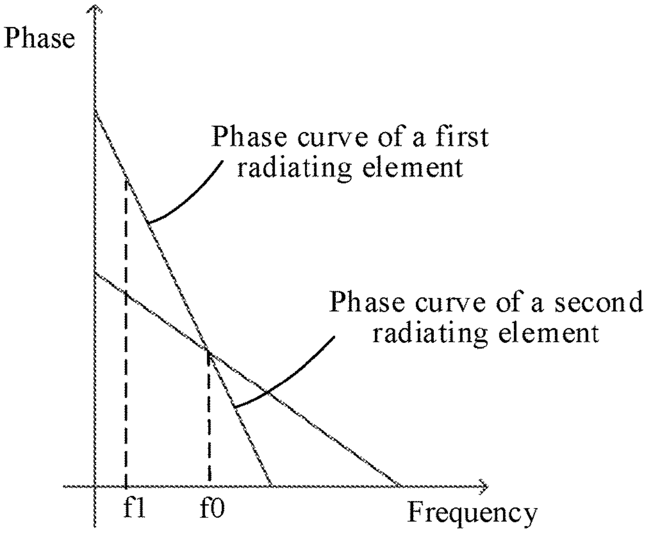

A larger quantity of levels of the composite right/left-handed transmission line indicates a larger adjustment amplitude of the phase slope of the electromagnetic signal of the first radiating element and the phase slope of the electromagnetic signal of the second radiating element and a larger adjustment amplitude of a direction of a combined beam of the first radiating element and the second radiating element. For example, compared with (a) in FIG. 13, in (b) in FIG. 13, an adjustment amplitude of a phase difference between the electromagnetic signal of the first radiating element and the electromagnetic signal of the second radiating element is larger, and adjustment efficiency is higher.

Embodiment 2: A phase dispersion circuit includes a 180-degree bridge.

Figure 14:
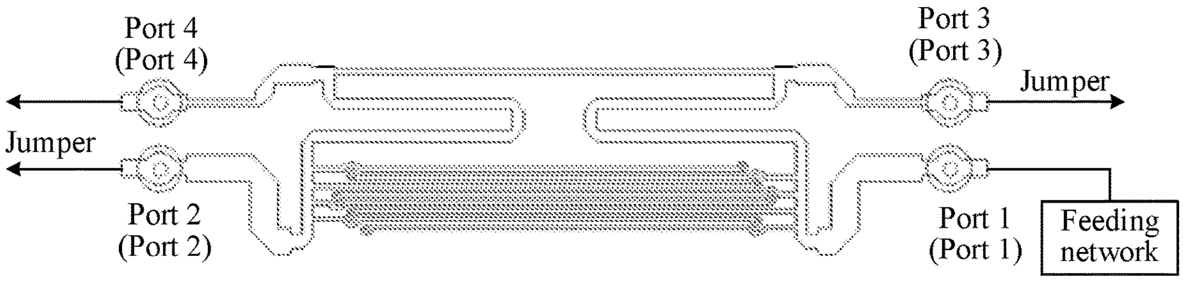
FIG. 14 is a schematic diagram of a structure of another phase dispersion circuit according to an embodiment of this application.

With reference to FIG. 14, a possible structure of a phase dispersion circuit is shown. A port 1 is used as an input end and is connected to an output end of a feeding network. An isolated input port 4 is connected to an absorption resistor, to improve isolation between output ports of the bridge, so that mutual coupling between a port 2 and a port 3 can be reduced. A jumper of the port 2 is connected to a first radiating element, and a jumper of the port 3 is connected to a second radiating element.

The phase dispersion circuit in Embodiment 2 includes the 180-degree bridge, the port 1, the port 2, the port 3, and the jumper. A phase slope of an electromagnetic signal of the first radiating element and/or a phase slope of an electromagnetic signal of the second radiating element are/is adjusted by using the 180-degree bridge, so that a phase curve of the electromagnetic signal of the first radiating element and/or a phase curve of the electromagnetic signal of the second radiating element forms two parallel lines with a 180-degree phase difference in an operating frequency band. Then, a length of a jumper of the first radiating element and/or a length of a jumper of the second radiating element are adjusted, so that a phase curve of S31 (an electromagnetic signal from the port 1 to the port 3) intersects with a phase curve of S21 at a first frequency. Specifically, the phase curve of S31 and the phase curve of S21 intersect at the first frequency by adding ½ wavelength (a wavelength corresponding to the 180-degree phase difference) to a length of the jumper corresponding to the port 3 compared with a length of the jumper corresponding to the port 2, or the phase curve of S31 and the phase curve of S21 intersect at the first frequency by adding ½ wavelength to a length of the jumper corresponding to the port 2 compared with a length of the jumper corresponding to the port 3. It should be noted that, finally, the phase dispersion circuit causes a sudden change in the phase slope of the electromagnetic signal of the first radiating element and/or the phase slope of the electromagnetic signal of the second radiating element, and the phase curves of the electromagnetic signals of the two radiating elements intersect at f0, so that the phase slope of the electromagnetic signal of the first radiating element and the phase slope of the electromagnetic signal of the second radiating element are different in the operating frequency band. For other detailed descriptions, refer to Embodiment 1 for understanding. Details are not described again.

In Embodiment 1 and Embodiment 2, because a phase dispersion circuit and a jumper are inserted into a branch of the feeding network, a phase that is output to a corresponding radiating element by the branch into which the phase dispersion circuit is inserted lags. Therefore, phases of other radiating elements in the antenna array 60 at the first frequency need to be separately adjusted based on a phase required by a beam of the antenna array 60 at a specific tilt.

The phases of the other radiating elements in the antenna array 60 at the first frequency may be adjusted by adding or subtracting a length of a feeder of each branch.

In the foregoing embodiments, the antenna array 60 provided in this application is described by using phases of different radiating elements as examples. During actual implementation, a preset phase difference may be added to the radiating elements based on a downtilting requirement of an antenna beam, that is, to enable a specific phase difference between the radiating elements, so that phase distribution between radiating elements that are vertically arranged in the antenna array is approximately linear, to achieve optimal radiation performance.

In the accompanying drawings in embodiments of this application, a quantity of antenna arrays, a quantity of radiating elements in an antenna array, a location of a radiating element in an antenna array, and the like are merely examples. During actual implementation, the quantities may be greater or less than that in the figure, or the location may be different from that in the figure. This is not limited in this application. Embodiment 1 and Embodiment 2 of this application merely provide two types of phase dispersion circuits as examples. During actual implementation, the phase dispersion circuit may be constructed in another manner, provided that a function required in this application can be implemented. This is not limited in this application.

This application is described merely by using an example in which a phase slope of an electromagnetic signal of a radiating element in a non-linear array is adjusted. During actual implementation, if there are a plurality of non-linear arrays, a phase dispersion circuit may exist in each non-linear array, so that a phase slope of an electromagnetic signal of a radiating element in a corresponding non-linear array is adjusted. This is not limited in this application. This application further provides a base station, including the antenna described above. The base station in this application may be a macro base station, a micro base station (also referred to as a small cell), a relay station, an access point (AP), or the like in various forms. For example, the base station may be an evolved NodeB (eNB or eNodeB), a next generation node base station (gNB), a next generation eNB (ng-eNB), a relay node (RN), or an integrated access and backhaul (JAB) node. In systems using different radio access technologies (RATs), names of devices having a base station function may be different. For example, the base station may be referred to as an eNB or an eNodeB in an LTE system, and may be referred to as a gNB in a 5G system or an NR system. A specific name of the base station is not limited in this application.

What is claimed is:

1. A base station antenna, comprising:
- a plurality of antenna arrays, at least one antenna array of the plurality of antenna arrays comprising a plurality of radiating elements, wherein the plurality of radiating elements comprises a first radiating element and a second radiating element, a horizontal spacing is between the first radiating element and the second radiating element, and the first radiating element and the second radiating element operate in a same operating frequency band; and
- a phase dispersion circuit, wherein the phase dispersion circuit is configured to:
  - adjust a phase slope of an electromagnetic signal of the first radiating element in the operating frequency band to be different from a phase slope of an electromagnetic signal of the second radiating element in the operating frequency band, or to adjust the phase slope of the electromagnetic signal of the second radiating element in the operating frequency band to be different from the phase slope of the electromagnetic signal of the first radiating element in the operating frequency band, comprising:
  - adjusting the phase slope of the electromagnetic signal of the first radiating element or the phase slope of the electromagnetic signal of the second radiating element by using the phase dispersion circuit in a manner that the phase slope of the electromagnetic signal of the first radiating element or the phase slope of the electromagnetic signal of the second radiating element changes, and phase curves of the first radiating element and the second radiating element intersect or are parallel; and
- adjust a length of a jumper of the first radiating element in the phase dispersion circuit or a length of a jumper of the second radiating element in the phase dispersion circuit in a manner that phase curves of the first radiating element and the second radiating element intersect at a first frequency of the antenna array; and
- wherein a first combined beam and a second combined beam have different horizontal pointings, and the first combined beam is obtained through combination by the first radiating element and the second radiating element when an operating frequency of the antenna array is less than the first frequency of the antenna array, and the second combined beam is a beam obtained through combination by the first radiating element and the second radiating element when the operating frequency of the antenna array is greater than the first frequency of the antenna array.

2. The base station antenna according to claim 1, further comprising:
- a feeding network;
- wherein an input end of the phase dispersion circuit is connected to an output end of the feeding network; and
- wherein a first output end of the phase dispersion circuit is connected to an input end of the first radiating element, and a second output end of the phase dispersion circuit is connected to an input end of the second radiating element.

3. The base station antenna according to claim 1, wherein the plurality of radiating elements further comprises a third radiating element, the third radiating element operates in the operating frequency band, a third output end of the phase dispersion circuit is connected to an input end of the third radiating element, and the phase dispersion circuit is further configured to adjust a phase slope of an electromagnetic signal of the third radiating element in the operating frequency band.

4. The base station antenna according to claim 1, wherein the horizontal spacing between the first radiating element and the second radiating element is 0.25 times to 1 time a wavelength corresponding to a center frequency in the operating frequency band of the at least one antenna array.

5. The base station antenna according to claim 4, wherein the phase dispersion circuit comprises a composite right/left-handed transmission line.

6. The base station antenna according to claim 4, wherein the phase dispersion circuit comprises a 180-degree bridge.

7. The base station antenna according to claim 1, wherein the phase dispersion circuit comprises a composite right/left-handed transmission line.

8. The base station antenna according to claim 1, wherein the phase dispersion circuit comprises a 180-degree bridge.

9. The base station antenna according to claim 1, wherein each electromagnetic signal comprises a transmit signal or a receive signal.

10. The base station antenna according to claim 1, wherein the phase dispersion circuit is configured to adjust the phase slope of the electromagnetic signal of the first radiating element in the operating frequency band and the phase slope of the electromagnetic signal of the second radiating element in the operating frequency band.

11. A base station, comprising:

a base station antenna, comprising:

a plurality of antenna arrays, wherein at least one antenna array of the plurality of antenna arrays comprises a plurality of radiating elements, wherein the plurality of radiating elements comprises a first radiating element and a second radiating element, a horizontal spacing is between the first radiating element and the second radiating element, and the first radiating element and the second radiating element operate in a same operating frequency band; and a phase dispersion circuit, wherein the phase dispersion circuit is configured to:

adjust a phase slope of an electromagnetic signal of the first radiating element in the operating frequency band to be different from a phase slope of an electromagnetic signal of the second radiating element in the operating frequency band, or to adjust the phase slope of the electromagnetic signal of the second radiating element in the operating frequency band to be different from the phase slope of the electromagnetic signal of the first radiating element in the operating frequency band, comprising:

adjusting the phase slope of the electromagnetic signal of the first radiating element or the phase slope of the electromagnetic signal of the second radiating element by using the phase dispersion circuit in a manner that the phase slope of the electromagnetic signal of the first radiating element or the phase slope of the electromagnetic signal of the second radiating element changes, and phase curves of the first radiating element and the second radiating element intersect or are parallel; and adjust a length of a jumper of the first radiating element in the phase dispersion circuit or a length of a jumper of the second radiating element in the phase dispersion circuit in a manner that phase curves of the first radiating element and the second radiating element intersect at a first frequency of the antenna array; and wherein a first combined beam and a second combined beam have different horizontal pointings, and the first combined beam is obtained through combination by the first radiating element and the second radiating element when an operating frequency of the antenna array is less than the first frequency of the antenna array, and the second combined beam is a beam obtained through combination by the first radiating element and the second radiating element when the operating frequency of the antenna array is greater than the first frequency of the antenna array.

12. The base station according to claim 11, wherein the base station antenna further comprises:

a feeding network;

wherein an input end of the phase dispersion circuit is connected to an output end of the feeding network; and wherein a first output end of the phase dispersion circuit is connected to an input end of the first radiating element, and a second output end of the phase dispersion circuit is connected to an input end of the second radiating element.

13. The base station according to claim 12, wherein the phase dispersion circuit comprises a composite right/left-handed transmission line.

14. The base station according to claim 12, wherein the phase dispersion circuit comprises a 180-degree bridge.

15. The base station according to claim 11, wherein the plurality of radiating elements further comprises a third radiating element, the third radiating element operates in the operating frequency band, a third output end of the phase dispersion circuit is connected to an input end of the third radiating element, and the phase dispersion circuit is further configured to adjust a phase slope of an electromagnetic signal of the third radiating element in the operating frequency band.

16. The base station according to claim 11, wherein the horizontal spacing between the first radiating element and the second radiating element is 0.25 times to 1 time a wavelength corresponding to a center frequency in the operating frequency band of the at least one antenna array.

17. The base station according to claim 11, wherein the phase dispersion circuit comprises a composite right/left-handed transmission line.

18. The base station according to claim 11, wherein the phase dispersion circuit comprises a 180-degree bridge.

19. The base station antenna according to claim 11, wherein each electromagnetic signal comprises a transmit signal or a receive signal.

20. The base station according to claim 11, wherein the phase dispersion circuit is configured to adjust the phase slope of the electromagnetic signal of the first radiating element in the operating frequency band and the phase slope of the electromagnetic signal of the second radiating element in the operating frequency band.

* * * * *